Aug. 23, 1960 H. E. REVERCOMB 2,950,342

SIGNAL SEPARATION CIRCUITS

Filed June 28, 1954

INVENTOR:
HENRY E. REVERCOMB,
BY Donald N. Timbie
HIS ATTORNEY.

United States Patent Office 2,950,342
Patented Aug. 23, 1960

2,950,342

SIGNAL SEPARATION CIRCUITS

Henry E. Revercomb, North Syracuse, N.Y., assignor to General Electric Company, a corporation of New York Filed June 28, 1954, Ser. No. 439,780
4 Claims. (Cl. 178—7.3)

The present invention relates to biasing means particularly suited for amplitude-discriminatory circuits of the type commonly known as clippers such as those employed for removing the picture-signal information from a composite television signal wave, leaving the synchronizing pulses or "supersync" for synchronizing the scanning oscillator of a television receiver with those of a selected television transmitter.

In accordance with present-day television broadcasting standards in the United States of America, negative amplitude-modulation of the video carrier wave is employed to transmit the picture information. The average brightness of a televised scene is represented in the composite signal wave by the so-called D.-C. component, whose amplitude varies inversely with the picture brightness. Total blackness of a depicted scene is represented by a signal whose amplitude is 75% of the full signal amplitude. Thus, blackness corresponds to 75% negative modulation of the carrier wave. The background brightness reference level, namely, the 75% signal amplitude level, is also the level at which the blanking pulses are transmitted, and is referred to as the "pedestal" level, as well as the "black" level. The region between 75% and 100% of maximum signal amplitude is known as the "blacker than black" region and is utilized for transmitting the horizontal and vertical synchronizing information in the form of pulses. The synchronizing pulses are transmitted during the blanking period, i.e., during intervals when the picture scanning beam is interrupted or blacked-out between line-scanning traces. Thus, the synchronization pulses do not interfere with the picture image. In the composite wave, therefore, the synchronization pulses appear as "spikes" atop the blanking pulses, the latter being known as "pedestals."

It is an object of the present invention to provide an improved circuit for clipping the synchronizaiton pulses of a composite television signal wave.

It is another object of the present invention to provide an improved synchronization pulse clipper having improved operating stability in view of interfering noise pulse transients.

It is still another object of the present invention to provide an improved synchronization clipper circuit that is capable of satisfactory operation in response to relatively weak signal waves.

It is a further object of the present invention to provide an improved circuit for clipping the synchronization impulses of a composite television signal wave wherein high-frequency noise impulses have substantially no effect upon the clipping level.

It is a still further object of the present invention to provide an improved circuit for clipping the synchronization impulses of a composite television signal wave in which effective noise limiting is provided for both high-frequency and low-frequency noise transients.

Briefly stated, one form of the present invention contemplates the provision in a television receiver of an amplitude responsive clipper circuit, and an integrating circuit. A composite television signal wave is applied to the integrating circuit for establishing "black level" of the composite signal wave. The output of the integrator is coupled through suitable impedance-matching means, which may include a cathode-follower circuit, to provide a dynamic bias potential for the clipper circuit, thereby to determine the amplitude level at which the clipper circuit provides its clipping action to remove a predetermined portion of the composite wave.

In accordance with one mode of the invention, means may preferably be provided for maintaining a substantially constant bias on the control-electrode system of the picture device, thereby to insure a maximum of picture information under relatively weak signal conditions.

The circuit preferably also includes the provision of an automatic gain-control means for simultaneously stabilizing the average signal-level applied to the picture device, notwithstanding fluctuations in the average level of signal applied to the detector circuit.

For additional objects and advantages, and for a better understanding of the invention, attention is now directed to the following description and accompanying drawings. The features of the invention which are believed to be novel are particularly pointed out in the appended claims.

Figure 1:
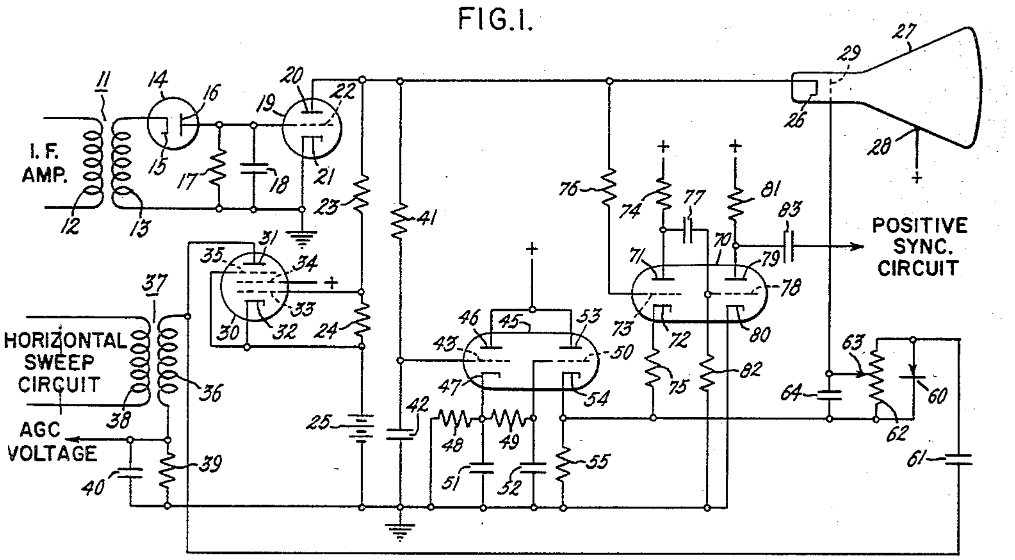
Figure 1 is a schematic circuit diagram of a portion of a television receiving apparatus embodying one form of the present invention.

Referring now to Figure 1, there is shown a coupling transformer 11 having a primary winding 12 under a secondary winding 13. The primary 12 is connected to a source (not shown) of amplitude-modulated waves, such as an intermediate-frequency amplifier. The secondary 13 is connected to a diode detector circuit including a diode device 14 having a cathode 15 and an anode 16. One end of the secondary 13 is connected to the cathode 15 and the other end of winding 13 is connected to common ground. The anode 16 is connected to a diode load-resistor 17 having its other end connected to common ground. A diode load bypass capacitor 18 is connected across resistor 17 in a conventional manner. The output of the diode detector circuit, which appears across the load-resistor 17 and the capacitor 18, is coupled directly to a video amplifier comprising electron discharge device 19. Device 19 may conveniently be of the triode type as shown, comprising an anode 20, a cathode 21 and a control electrode 22. The coupling from detector 14 to amplifier 19 is accomplished by means of a direct connection from the anode 16 to the control grid 22 so as to provide D.-C. coupling therebetween. The cathode 21 is connected directly to ground. The anode 20 is connected to one side of a load-resistor 23 which is connected in series with an automatic-gain-control resistor 24 to the postive side of a source of operating potential 25 having its negative terminal connected to ground in a conventional manner. The anode 20 is also connected directly to the cathode 26 of a cathode-ray type picture tube 27. Picture device 27 is of conventional design and, in addition to the cathode 26, it comprises a conventional cathode-ray electrode system including a high-voltage anode connection 28 and a control electrode 29.

An integration circuit comprising a resistor 41 and a capacitor 42 is connected across the output of the amplifier 19. More specifically, the resistor 41 has one terminal connected to the anode 20 and its other terminal connected to one side of the capacitor 42 which has its remaining side connected to common ground. The junction between resistor 41 and capacitor 42 is connected to the control electrode 43 of an electron discharge device, shown as the first section of a conventional double-triode electron discharge device 45. The first section of the device 45 comprises, in addition to the grid 43, an anode 46 and a cathode 47. The anode 46 is connected to a suitable source of positive potential and the cathode 47 is connected through a cathode-resistor 48 to ground. The output of the first section of the device 45 is derived across the cathode-resistor 48 through a pi-type low-pass filter section and applied to the control electrode 50 of the second section of the electron discharge device 45. The pi-filter comprises a smoothing resistor 49 and a pair of filter capacitors 51 and 52 which connect the opposite ends of the resistor 49 to ground in a conventional manner. The second section of device 45 is a conventional triode comprising the grid 50, an anode 53 and a cathode 54. The anode 53 is connected to a suitable source of positive potential. The cathode 54 is connected through a cathode-resistor 55 to ground. The output of the second section of the device 45 is derived across the cathode-resistor 55 and connected through a biasing circuit to the control electrode 29 of cathode-ray tube 27.

The biasing circuit for device 27 comprises a diode rectifier 60 which, for example, may be of the barrier-layer type as shown. The rectifier 60 is supplied with a suitable source of bias potential in a conventional manner, as by means of the connection shown in the instant case which is a tap on the horizontal sweep transformer 37. The biasing potential taken from transformer 37 is derived by means of a connection to the side of the secondary winding 36 remote from ground through a coupling capacitor 61 to one side of the diode 60. The other side of the diode 60 is connected through the cathode-resistor 55 to ground. A bleeder-resistor 62 is connected across the terminals of the diode 60. A tap 63 is provided for adjustably selecting the bias to device 27. A filter-capacitor 64 is connected across the operative bias portion of the bleeder 62. The tap 63 is connected to the control grid 29 of device 27.

By thus connecting the biasing circuit, including the diode device 60, in series with the cathode-resistor 55, the bias applied to the cathode-ray control circuit includes a component of fixed bias along with one that varies as the black-level of the received signal, thereby tending to insure adequate picture information even under relatively weak signal conditions.

The clipper portion of the circuit comprises a pair of triode discharge devices which may conveniently be enclosed in a single envelope 70, as shown. The first section of the device 70 includes an anode 71, a cathode 72 and a control grid 73. The anode 71 is connected through a load resistor 74 to the positive side of a suitable source of operating potential. The cathode 72 is connected through a cathode-resistor 75 to the cathode 54 of the second section of the device 45. The grid 73 is connected through a dropping resistor 76 to the cathode 26 of the picture device 27. The output of the first section of the device 70 is derived at the anode 71 and coupled through a coupling capacitor 77 to the control electrode 78 of the second section of the device 70.

The second section of the device 70 comprises an anode 79 and a cathode 80 in addition to the control electrode 78. The anode 79 is connected through a load-resistor 81 to the positive side of the source. The cathode 80 is connected directly to ground. The control electrode 78 is connected through a conventional grid-biasing resistor 82 to ground. The output of this second section of device 70 with respect to ground is derived from the anode 79 through a suitable coupling capacitor 83, whence it is connected in a conventional manner to the synchronizing circuits (not shown).

There is also provided a keyed automatic-gain-control circuit comprising electron discharge device 30. Device 30 is of the pentode type including an anode 31, a cathode 32, a control grid 33, a screen grid 34, and a suppressor grid 35. The control grid 33 is connected to the junction between the load resistor 23 and the automatic-gain-control resistor 24. The cathode 32 is connected to the junction between the gain-control resistor 24 and the positive side of the source 25. The screen grid 34 is connected to a source of positive potential in a conventional manner. The suppressor grid 35 is connected directly to the cathode 32. The anode 31 is connected to the first side of the secondary winding 36 of the horizontal sweep transformer 37. Transformer 37 also includes the primary winding 38 which is connected to the horizontal sweep circuit (not shown). The second side of the secondary winding 36 is connected through a conventional gain-control load-resistor 39 to ground. A filter-capacitor 40 is connected across the resistor 39. The automatic-gain-control output voltage is derived across the resistance-capacitance combination 39, 40 formed by these components with respect to ground and applied to an anterior portion of the circuit in a conventional manner to control the gain of the receiver.

Briefly stated, the operation of the above-described circuit is as follows:

A signal-modulated carrier wave is coupled to the detector device 14 by means of the transformer 11. The output of the detector appears across resistor 17 with respect to ground. In accordance with present-day standards, as mentioned above, the polarity of the detected signal wave is such that the anode 16 of the device 14 becomes more negative in potential as the amplitude of the synchronization pulses increases. Thus, it may be said that the detector output voltage appears across resistor 17 with the synchronization pulses in a negative-going sense. However, it is necessary, according to today's standards, to supply video signal waves to the cathode 26 of the cathode-ray tube 27 of such polarity that the synchronization pulses are positive-going. This is accomplished by the amplifier device 19 which inverts the phase of the signal wave in a well-known manner. Thus, the output amplifier 19 appearing across load-resistor 23 is such that the synchronization pulses are positive-going in polarity.

The integration circuit comprising resistor 41 and capacitor 42 filters the high-frequency components from the composite signal and provides a slowly varying component including D.-C. to the grid 43 of the first section of the device 45. The signal thus applied to the grid 43 is substantially at the black-level of the television signal since the time-constant of the integration circuit is such that it removes substantially all of the synchronization impulses but none of the vertical pedestal of the composite signal wave. The first section of the device 45 is connected as a cathode-follower circuit, the output being derived across the resistor 48 and further filtered by the action of the low-pass pi-filter 49, 51, 52 to hold the D.-C. level to a value near the peak value of the vertical pedestal. The second section of device 45 is likewise connected as a cathode-follower. The output of the two halves of the device 45, appearing across the resistor 55, is substantially at black-level with respect to ground plus the operating bias of the two halves of the device 45. The D.-C. level appearing across resistor 55 is less than that appearing at the output of the integrator circuit due to the usual D.-C. loss in the cathode-follower circuits.

In a preferred embodiment it was found that the filter capacitor 51 should preferably be of relatively large value so that it discharges very little from one vertical pedestal to another, thereby effectively to retain the black-level during the horizontal pedestals.

In order to retain the black-level at the cathode 47, the value of resistor 48 should preferably be of relatively high value for a cathode-resistor, in order to provide a relatively high-resistance path to ground. The cathode-resistor 55 on the other hand should preferably be of relatively low-resistance value in order to conduct the cathode-current of the first section of the device 70 without producing a materially high voltage fluctuation at the cathode 54 of the second section of the device 45.

In accordance with a preferred embodiment, the output of device 45 appearing across resistor 55 is coupled through the biasing circuit comprising the diode rectifier 60 and the associated elements 62, 63 and 64 to the control electrode 29 of the cathode-ray tube 27. The rectifier circuit, per se, including device 60 is of conventional design for the rectification of the horizontal sweep impulses derived from the secondary winding 36. The present circuit offers the advantage of providing a substantially constant bias on picture tube 27, thereby giving a maximum of picture information in weak signal areas, such as those where automatic-gain-control circuitry ceases to be effective. It is believed apparent to those skilled in the art that, apart from the advantages of this feature of the invention, other sources of voltage might be used solely to provide biasing potential. For example, in certain cases where the automatic-gain-control circuit is always operating, rather than keyed as in the present caase, the rectifier circuit including device 60 might be replaced by a simple bleeder circuit connected to a suitable source of potential.

The D.-C. output of the two sections of device 45, appearing across the resistor 55, also provides an operating or dynamic bias of sync positive-going polarity (although no sync is actually present) for the cathode 72 of device 70 in order to establish a positive dynamic bias level which provides, in well-known manner, for conduction of the first section of the device 70 only during the peaks of the composite signal waves of sync positive-going polarity which are applied to the grid 73. In effect, the positive bias applied to the cathode 72 biases the grid 73 beyond cut-off. By a proper selection of devices 45 and 70 and by proper adjustment of the voltage supplied to the anode 71, the first section of device 70 can be adjusted to conduct slightly above the level of the blanking pulses i.e., just above the pedestal level. The remainder of the composite signal wave, including the picture information, is thereby removed in the device 70.

Thus, the first section of device 70, in cooperation with the dynamic biasing circuit of device 45, truncates the synchronization pulses near their base and inverts their phase relationship of such an amplifier stage in the usual manner. These truncated pulses, which appear at the anode 71 as synchronization pulses of negative-going polarity, are then applied to the control-grid 78 of the second section of device 70 where, in conventional manner, they are clipped at the top. More specifically, the grid 78 is biased in a well-known manner, as by the self-biasing resistor 82, as shown, causing conduction in the second section of the device 70 to be cut off when the (negative) signal voltage applied to the grid 78 reaches a predetermined negative value. By clipping the synchronization pulses at the bottom in the first section of the device 70 and by clipping the same pulses at the top in the second section of the same device there is produced a substantially square wave pulse which may be applied to the appropriate sweep circuits in the usual manner.

The second section of the device 70 also serves to re-invert the phase of the applied signal, thus producing substantially squared synchronization pulses of positive-going polarity.

Figures 2, 3:
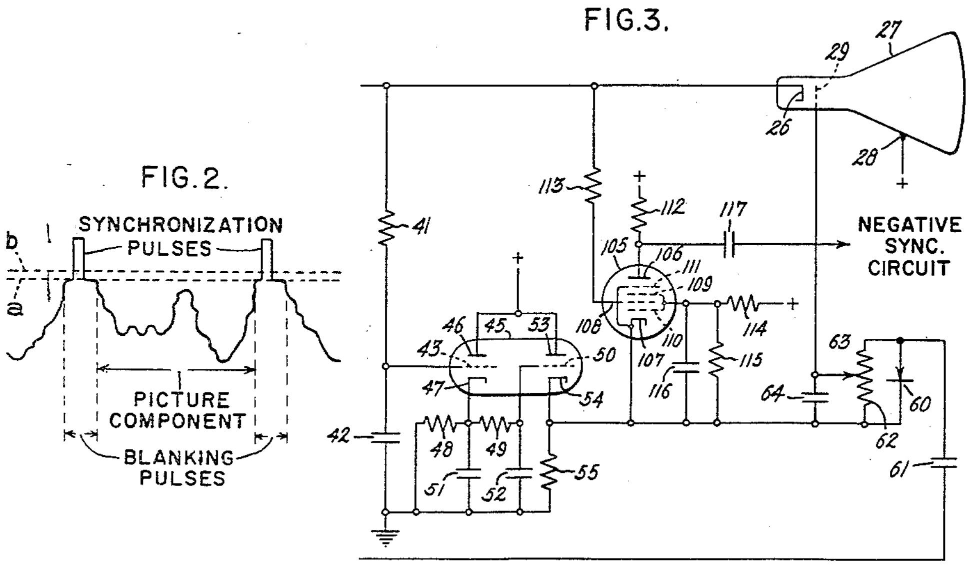
Figure 2 is a curve showing a composite television signal wave and demonstrating the effect of the present invention upon such a wave.
Figure 3 is a schematic circuit diagram of a portion of a television receiving apparatus similar to that of Figure 1, but embodying a modified form of the present invention.

Referring now to Figure 2, there is shown a portion of a conventional composite television signal wave including two successive horizontal blanking pulses or pedestals. During a selected part of each of the blanking pulses, a horizontal synchronization pulse appears forming a horizontal "spike" atop the "pedestal" portion of the composite wave. The lower broken line "*a*," just above the pedestal level, represents the minimum conductive or "clipping" level of the first section of the device 70. The upper broken line "*b*" represents the maximum conductive level (with respect to the pedestal) of the second section of device 70. The substantially square wave portion of each "spike" between the upper and lower broken line "*a*," "*b*" represents the wave form of the output of the device 70.

The keyed automatic-gain-control circuit comprising electron discharge device 30 is, per se, of conventional design. The output of the device 30 is determined by the voltage appearing across automatic-gain-control resistor 24 connected in series with the load-resistor 23; hence, the gain-control-circuit operates in accordance with the signal voltage delivered by the device 19. Since the anode 31 of the device 30 is connected in series with the secondary winding 36 of the horizontal sweep transformer 37, it is operative only during horizontal pulses and, therefore, is relatively insensitive to noise transients. As mentioned supra, the automatic-gain-control output is derived across the automatic-gain-control load circuit 39, 40 and coupled back to a prior portion of the television receiver to stabilize the receiver gain level in a conventional manner.

Among the advantages of the above-described circuit is its relative stability in the face of interfering noise pulses of both high and low frequencies. The fast-acting automatic-gain-control circuit tends to stabilize the system against the effect of low-frequency noise or signal variations and the clipping level is substantially unaffected by high-frequency noise transients.

Another advantage of this circuit is its self-compensating features in fringe areas of signal reception where the self-regulating action of the automatic-gain-control circuit, per se, becomes less effective. More specifically, even though the signal strength should fall to a relatively low value and the signal voltage applied to the cathode-ray tube 27 becomes relatively weak; nevertheless, the bias applied respectively between the cathode 72 and the control grid 73 of the clipper device 70 and the cathode 26 and control grid 29 of the picture tube 27, remain substantially unaffected. In view of this, the clipper circuit continues to provide a substantially rectangular "slice" of sync and the picture tube remains substantially in optimum adjustment.

The operation of the present circuit in relatively weak signal areas, where automatic-gain-control action is substantially ineffective, may be further enhanced by the application of a substantially constant bias to the control electrodes of the cathode-ray tube 27, as by means of the biasing circuit including the diode 60 and associated circuitry.

In Figure 3, there is shown a modified form of the present invention in which the two-sectional device 70 shown in Figure 1, has been replaced by a single electron discharge device 105. Corresponding elements to those of Figure 1 bear identical reference numerals. The remainder of the circuit, not shown, may correspond to that of Figure 1.

More specifically, the clipper circuit comprises a single electron discharge device 105 in lieu of the two-sectioned device 70 shown in Figure 1. Device 105 may be of the pentagrid type, as shown, comprising an anode 106, a cathode 107, a control electrode 108, a pair of screen grids 109 and 110 (one on either side of the control electrode 108) and a suppressor grid 111. The anode 106 is connected through a conventional load-resistor 112 to the positive side of the source. The cathode 107 is connected directly to the cathode of the dynamic biasing device 45. The control electrode 108 is connected through a grid resistor 113 to the cathode 26 of the cathode-ray device 27. The screen grids 109 and 110 are connected together within the envelope of the device 105 and are connected through a screen-dropping resistor 114 to the positive side of the source. A screen-decoupling resistor 115 is connected in parallel with a screen-bypass capacitor 116 from the screen grids 109 and 110 to the cathode 107. The output of the clipper circuit with respect to ground is derived from the anode 106 through a coupling capacitor 117.

The circuit of Figure 3 operates in accordance with principles of the circuit shown in Figure 1. Generally like the circuit of Figure 1, the cathode-follower circuit including the device 45 functions in cooperation with the integrator circuit comprising resistor 41 and capacitor 42 to provide a dynamic biasing potential to the cathode 107 of the clipper device 105, this biasing potential, appearing at the cathode 107, is substantially at black-level with respect to ground plus the operating bias of the second section of the device 45. The dynamic bias thus applied to the cathode 107 of the device 105 is of sync positive-going polarity (although no sync is actually present), i.e., it is of the same dynamic polarity and varies as the D.-C. component of the composite signal wave which is applied to the control grid 108. By a proper selection of the type electron discharge device employed for device 105 and by proper adjustment of operating potentials for that device, it may thereby be dynamically biased beyond cut-off so that it does not conduct until the signal applied to the control grid 108 rises slightly above the pedestal level of the composite signal wave. Thus, the sync pulses applied to the grid 108 are truncated at their base in similar manner to those applied to the first section of the device 70 shown in Figure 1.

The tops of the sync pulses are removed in the device 105 by providing for a maximum conductive limit which is below the peaks of the sync pulses. This may be accomplished in known manner, as by suitably biasing the electrodes of clipper device 105 to cause anode-current saturation at a predetermined signal-voltage level. The output of the clipper device 105, with respect to ground, is derived from the anode 106 through the coupling capacitor 117 for utilization by subsequent circuitry in known manner.

It should be noted that the output of the clipper 105 differs from the clipper output of the circuit shown in Figure 1, inasmuch as the output of the present device 105 comprises a substantially squared synchronization pulse of sync negative-going polarity rather than sync positive-going polarity. The difference in polarity is due to the obvious fact that there is no phase re-inversion in the present circuit, whereas there is such a re-inversion in the circuit of Figure 1.

While specific embodiments have been shown and described, it will, of course, be understood that various modifications may be made without departing from the principles of the invention. The appended claims are, therefore, intended to cover any such modifications within the true spirit and scope of the invention.

What I claim as new and desire to secure by Letters Patent of the United States is:

1. In a television receiving apparatus adapted to receive a composite television signal wave comprising a carrier wave including amplitude-modulation components including a picture component, a recurrent reference pulse component having a predetermined time duration and an average amplitude in excess of the average maximum amplitude of said picture component, and a recurrent synchronization pulse component having a shorter time duration than said reference pulse and an average amplitude in excess thereof, the combination comprising, a detector for demodulating said carrier wave, a video amplifier having an input and an output with said input connected to said detector, an integrating network comprising a resistor and a capacitor serially connected between the output of said video amplifier and a point of fixed reference potential for removing substantially all of said recurrent synchronization pulse component from said wave, first and second electron discharge devices each having anode, cathode and control electrodes, means for connecting the junction of said resistor and said capacitor to the control electrode of said first electron discharge device, a first cathode impedance connected between the cathode electrode of said first electron discharge device and said point of fixed reference potential for developing an output from said first electron discharge device, means for coupling the cathode electrode of said first electron discharge device to the control electrode of said second electron discharge device, means for continually applying a biasing potential to the plate electrodes of said first and second electron discharge devices, and a second cathode impedance connected between the cathode of said second electron discharge device and said point of fixed reference potential.

2. The structure defined in claim 1 wherein said means for coupling the cathode electrode of said first electron discharge device to the control electrode of said second electron discharge device includes a filter for filtering the output from said first electron discharge device to hold said output near the peak amplitude of said recurrent reference pulse component.

3. In a television receiving apparatus adapted to receive a composite television signal wave, the combination comprising a detector for demodulating said carrier wave, a video amplifier having an input and output with said input being coupled to said detector, an integrating network comprising a resistor and a capacitor serially connected between said video amplifier output and a point of fixed reference potential for removing substantially all of said recurrent synchronization pulse component from said wave, first and second electron discharge devices each having anode, cathode, and control electrodes, means for connecting the junction of said resistor and said capacitor to the control electrode of said first electron discharge device, a first cathode impedance connected between the cathode electrode of said first electron discharge device and said point of fixed reference potential for developing the output of said second electron discharge device, means for coupling the cathode electrode of said first electron discharge device to the control electrode of said second electron discharge device, means for continually applying a biasing potential to the plate electrodes of said first and second electron discharge devices, a second cathode impedance connected between the cathode of said second electron discharge device and said point of fixed reference potential for developing the output of said second electron discharge device, a third electron discharge device having plate, cathode and control electrodes, means coupling said video amplifier output to the control electrode of said third electron discharge device, and means for coupling said second cathode impedance to the cathode of said third electron discharge device.

4. In a television receiving apparatus adapted to receive a composite television signal wave comprising a carrier wave including amplitude-modulation components including a picture component, a recurrent reference pulse component having a predetermined time duration and an average amplitude in excess of the average maximum amplitude of said picture component, and a recurrent synchronization pulse component having a shorter time duration than said reference pulse and an average amplitude in excess thereof, the combination comprising, a detector for demodulating said carrier wave, a video amplifier for amplifying said demodulated wave having input and output terminals, said input tterminals being connected to said detector, an integrating circuit comprising a resistor and a capacitor connected in the order named between the output terminals of said video amplifier and a point of fixed reference potential for removing substantially all of said recurrent synchronization pulse component from said wave, means connected between the resistor and capacitor of said integrating circuit and said point of fixed reference potential for developing a dynamic biasing potential corresponding substantially to the amplitude of said reference pulses, a clipper circuit including an electron discharge device having a cathode, anode and control electrode, means for directly coupling said control electrode to the output of said video amplifier, means for applying said dynamic biasing potential to said cathode thereby biasing said electron discharge device non-conductive until the signals applied thereto reach an amplitude exceeding the amplitude of said reference component, and means in said clipper circuit for clipping the amplitude of the output of said electron discharge device.

References Cited in the file of this patent

UNITED STATES PATENTS

| | | |
|---|---|---|
| 2,295,346 | Jones | Sept. 8, 1942 |
| 2,339,856 | Holmes | Jan. 25, 1944 |
| 2,356,141 | Applegarth | Aug. 22, 1944 |
| 2,651,675 | Wissel | Sept. 8, 1953 |
| 2,647,161 | Schleisinger | July 28, 1953 |
| 2,672,505 | Schwarz | Mar. 16, 1954 |
| 2,673,892 | Richman | Mar. 30, 1954 |
| 2,784,249 | Richman | Mar. 5, 1957 |